United States Patent Office 3,173,506
Patented Mar. 16, 1965

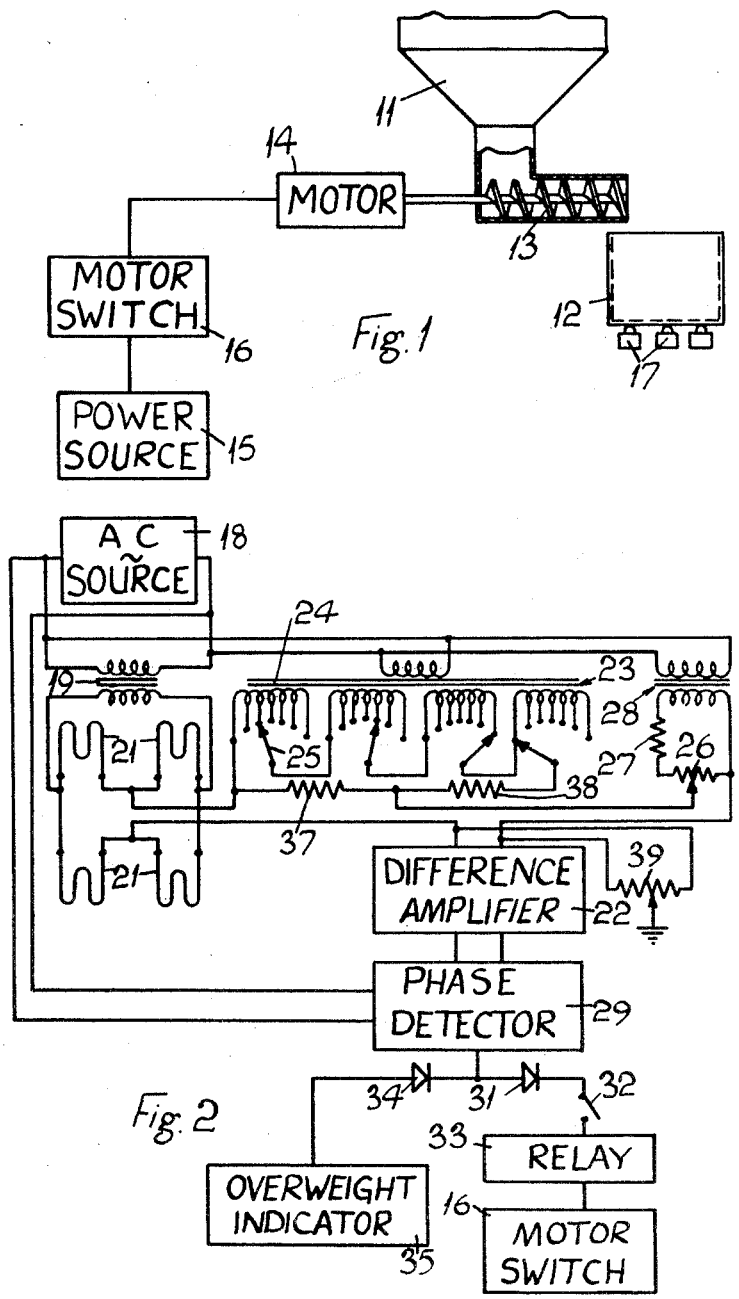

3,173,506
APPARATUS FOR DELIVERING PREDETERMINED
WEIGHTS OF A MATERIAL
David Warwick Lloyd Clamp, Knowle, Solihull, England, assignor to Joseph Lucas (Industries) Limited, Birmingham, England
Filed Mar. 4, 1963, Ser. No. 262,645
Claims priority, application Great Britain, Mar. 16, 1962, 9,688/62
2 Claims. (Cl. 177—211)

This invention relates to a method of, and apparatus for, delivering predetermined weights of a material.

A method in accordance with the invention comprises applying an A.C. voltage to the primary winding of a transformer, and across an A.C. bridge having associated therewith strain gauges the resistances of which are determined by the weight of material delivered, so that the magnitude of the output from the bridge is dependent on the weight of material delivered, comparing the output from the bridge with a predetermined proportion of the output from the secondary winding of the transformer, and terminating delivery of material when the two signals are of equal magnitude.

Apparatus in accordance with the invention comprises a hopper in which the material is stored, a container to which the material is to be delivered, means for controlling delivery from the hopper to the container, a bridge network connected to an A.C. source, strain gauges associated with the bridge so that the output from the bridge has a magnitude dependent on the weight of material in the second container, a transformer having its primary winding connected to the A.C. source, a difference amplifier to which the output voltage of the bridge and a predetermined, variable proportion of the output voltage of the transformer secondary are applied, so that the phase of the output from the difference amplifier will depend upon which of the signals applied thereto is of greater amplitude, and means operable by the output from the difference amplifier for operating said means to deliver material from the hopper to the container only when the amplitude of the signal received by the amplifier from the transformer secondary is greater than the amplitude of the signal received by the amplifier from the bridge.

In the accompanying drawings, FIGURE 1 is a sketch illustrating one example of weighing apparatus with which the invention can be employed, and FIGURE 2 is a circuit diagram.

Referring first to FIGURE 1, the material to be weighed is stored in a hopper 11 from which it can be delivered to a container 12 by an Archimedean screw 13 rotatable with the shaft of a motor 14. The motor can be energised from a power source 15 under the control of a motor switch 16 in a manner to be described with reference to FIGURE 2.

The container 12 is supported by load cells 17 each of which is in the form of a bridge network having at least one strain gauge in each arm. The load cells may be connected in series or in parallel, and produce an output dependent on the combined weight of the container 12 and its contents.

Referring now to FIGURE 2, there is provided an A.C. source 18 which provides power through a transformer 19 to the load cells 17. Only one of the cells 17 is shown in FIGURE 2, the strain gauges in the cell being indicated at 21. The output from the load cell 17 provides one input to a difference amplifier 22.

The source 18 also provides power to a further transformer 23 the secondary of which consists of a number of windings 24 each divided into a number of sub-divisions, the sub-divisions in successive windings being of increasing magnitude. The secondary output consists of a number of sub-divisions for each of the windings 24 determined by the setting of arms 25, the setting of these arms determining the required weight of material to be delivered to the container 12.

A portion of the output from the secondary of the transformer 23 is taken from a resistive potential divider 37, 38 and provides the second input to the difference amplifier 22 through a slider movable over a resistor 26 connected in series with a resistor 27 across the secondary winding of a transformer 28 the primary winding of which is fed from the source 18. The slider is adjustable to compensate for the weight of the container 12. Moreover, if desired instead of providing an additional transformer 28 an extra secondary winding could be provided on the transformer 23.

The purpose of the divider 37, 38 is to avoid difficulties which arise in switching the arms 25 at low voltages of the order of the output voltage of the load cells. With the arrangement described, only a proportion of the secondary voltage is applied to the amplifier, so that larger secondary voltages can be used.

The output from the amplifier 22 will have a phase dependent on which of the signals applied thereto is of greater magnitude. This output is fed to a phase detector 29 which also receives a signal from the source 18. The detector produces positive or negative output signals depending on whether the signals received from the source 18 and amplifier 22 are in phase or 180° out of phase. Positive signals from the detector 29 can pass through a diode 31 and a switch 32 to energise a relay 33 to close the motor switch 16. Negative signals can pass through a diode 34 to operate an overweight indicator 35.

Preferably, a resistor 39 is connected across the input to the amplifier 22 and a point intermediate its ends is earthed. The exact point to be earthed is chosen by trial and error to allow for capacitive effects between various leads and components, thereby ensuring that the inputs to the detector 29 are either in phase or 180° out of phase.

When a weighing operation is to be performed, the arms 25 are set to correspond to the desired weight. A circuit is then completed by closing the switch 32. Initially there will be no output from the load cells 17, and the phase detector 29 produces a direct current which operates the relay 33 and closes the switch 16 to operate the motor 14. Material is now delivered to the container 12 and the cells 17 produce an output the magnitude of which increases with the weight of material in the container 12. When the magnitudes of the signals from the cells 17 and the transformer 23 are equal, the current flowing in the relay 33 falls to zero, and the relay is deenergised to stop the motor 14.

If for any reason the motor 13 is not stopped sufficiently quickly and too much material is delivered to the container 12, the phase detector will produce an output of opposite polarity, which operates the indicator 35 to indicate the excess weight in the container 12.

It will be understood that the feeder 13 is acting as a valve, and the relay 33 could be used to control any other convenient form of valve.

Having thus described my invention what I claim as new and desire to secure by Letters Patent is:

1. Apparatus for delivering a predetermined weight of material, comprising a hopper in which the material is stored, a container to which the material is to be delivered, a control device for controlling delivery from the hopper to the container, an A.C. source, a bridge network connected to said A.C. source, strain gauges associated with said bridge, means connecting said strain gauges with said container so that the output from said bridge has a magnitude dependent on the weight of material in said container, a transformer having a primary winding connected to said A.C. source, and a plurality of unequal secondary windings, a plurality of arms movable over said secondary windings respectively, and interconnected whereby predetermined proportions of said windings can be combined to provide the secondary output of said transformer, and means for comparing the secondary output from said transformer with the output voltage from said bridge, and operating said control device to deliver material until said signals are equal.

2. Apparatus for delivering a predetermined weight of material, comprising a hopper in which the material is stored, a container to which the material is to be delivered, a control device for controlling delivery from said hopper to said container, an A.C. source, a bridge network connected to said A.C. source, strain gauges associated with said bridge network, means connecting said strain gauges with said container whereby the output from said bridge network has a magnitude dependent on the weight of material in said container, a transformer having a primary winding connected to said A.C. source, and a plurality of unequal secondary windings, a plurality of arms movable over said secondary windings and interconnected so that predetermined proportions of the secondary windings can be interconnected to constitute the secondary output of the transformer, a difference amplifier to which the output from said bridge is applied, a resistive potential divider through which the secondary output of the transformer is connected to said difference amplifier, said difference amplifier producing a signal whenever the inputs thereto are not equal, and means for operating said control device to cause delivery of material whenever the output from the transformer secondary to the amplifier is greater than the output from the bridge to said amplifier.

References Cited by the Examiner
UNITED STATES PATENTS

| | | | |
|---|---|---|---|
| 2,733,911 | 2/56 | Thurston | 177—211 |
| 2,766,981 | 10/56 | Lauler et al. | 177—211 |
| 2,868,491 | 1/59 | Thorsson et al. | 177—211 X |
| 2,871,891 | 2/59 | Lau | 177—1 X |
| 2,938,701 | 5/60 | Thorsson et al. | 177—211 X |
| 2,950,437 | 8/60 | Stahl | 235—179 |
| 3,081,830 | 3/63 | Spademan | 177—211 X |
| 3,106,979 | 10/63 | Chilton | 177—210 |

OTHER REFERENCES

"Radio Engineering," 3rd edition, F. E. Terman, New York, 1947 McGraw-Hill Book Co.; page 302 relied upon.

LEO SMILOW, *Primary Examiner.*